United States Patent
Toberman

[11] 3,885,163
[45] May 20, 1975

[54] EXPRESSWAY POWER GENERATING SYSTEM

[76] Inventor: Charles E. Toberman, 1717 No. Highland Ave., P.O. Box 3268, Hollywood, Calif. 90028

[22] Filed: Aug. 28, 1973

[21] Appl. No.: 392,269

[52] U.S. Cl. ................................ 290/1; 193/35
[51] Int. Cl. ............................................ H02p 9/04
[58] Field of Search ........ 417/229, 231, 233; 290/1; 193/35 N, 40; 198/127 E, 40

[56] References Cited
UNITED STATES PATENTS

| | | | |
|---|---|---|---|
| 1,312,131 | 8/1919 | Morton | 417/229 |
| 1,625,374 | 4/1927 | Reefe | 417/233 |
| 1,771,200 | 7/1930 | Akers | 417/229 |
| 2,020,361 | 11/1935 | Johnston | 417/903 |
| 3,245,510 | 8/1966 | Cowan | 193/40 |
| 3,352,397 | 11/1967 | Becker et al. | 193/35 A |
| 3,458,027 | 7/1969 | Matthews | 193/35 A |
| 3,557,925 | 6/1971 | Zulauf | 193/35 A |
| 3,713,521 | 1/1973 | Moritake | 193/35 N |

FOREIGN PATENTS OR APPLICATIONS 1,461,923 11/1966 France ............................ 193/35 A Primary Examiner—G. R. Simmons
Attorney, Agent, or Firm—Lyon & Lyon

[57] ABSTRACT

A system comprising a plurality of rollers or the like installed along expressway lanes or the like such that they will be actuated by vehicles passing over them. The rollers are coupled to a network of electrical power generators so that as vehicles pass along the expressway they cause production of useful electrical power.

1 Claim, 3 Drawing Figures

EXPRESSWAY POWER GENERATING SYSTEM

BACKGROUND OF THE INVENTION

The present invention relates generally to a power generating system and more specifically to a means for converting an hitherto untapped source of kinetic energy into useful power. Many types of energy, both kinetic and potential, have been utilized in the past for the production of or conversion into electrial energy, but there exists in our present society a form of energy heretofore unused for such purposes. The freeways and expressways, particularly those in large cities, contain an almost endless stream of vehicles which, other than conveying the occupants thereof to a particular destination, perform no other useful function. In addition, may factories, warehouses and the like find in necessary to convey merchandise from place to place and yet the kinetic energy of such movement is largely wasted except for actually moving the article itself. I propose to utilize this as a source of energy by providing a system for converting it into useful electrical power. While the ensuing description of my invention will be directed primarily to its use on an expressway powered by the motive force of motor vehicles passing thereover, it will be readily apparent that my invention is equally applicable to other situations where articles are conveyed from place to place.

SUMMARY OF THE INVENTION

It is an object, therefore, of the present invention to provide a power generating system which utilizes as its motive force the movement of a plurality of articles along a conveyance. I propose to accomplish this function by installing a plurality of motion convertors such as small rollers adjacent the conveyance in such a position that they will be actuated by articles passing thereover. Each of these devices is in turn coupled to a network of power generating devices which thereby provide an electrical power outlet.

Further objects and advantages of my invention will be readily apparent on reading the ensuing detailed description in conjunction with the accompanying drawings.

DESCRIPTION OF THE INVENTION

Figure 1:
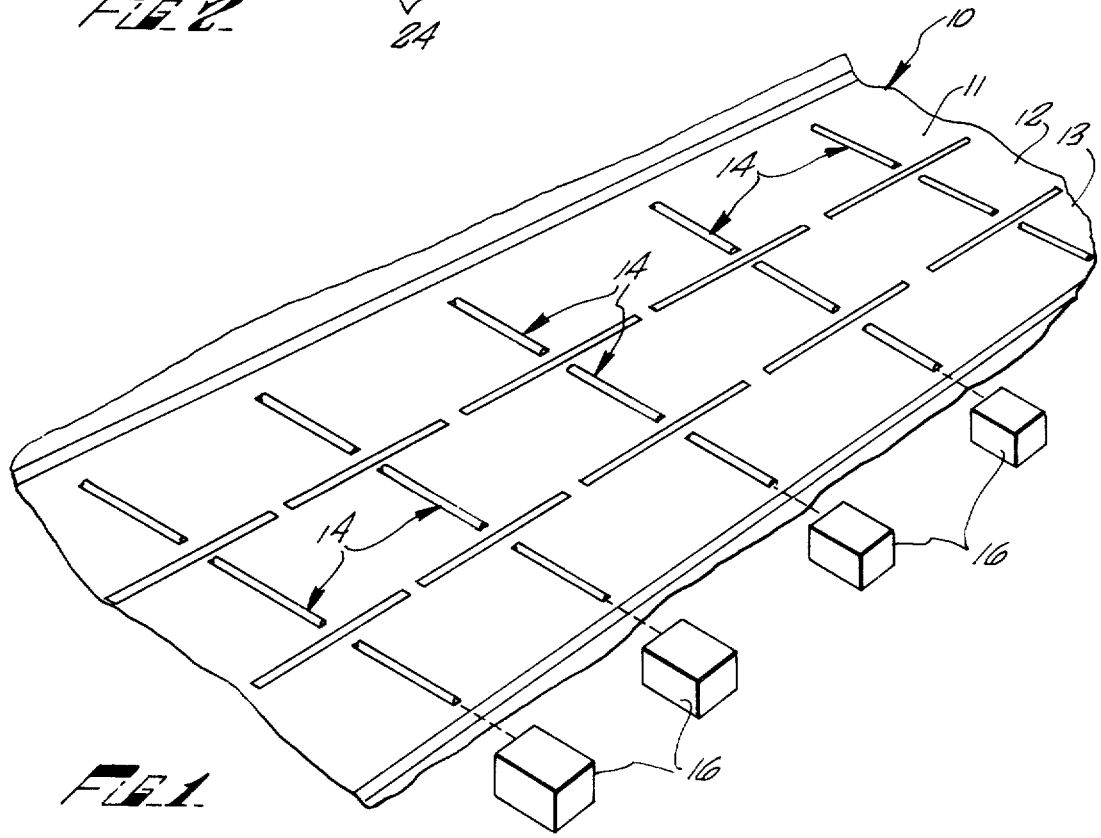
FIG. 1 is a perspective pictorial respresentation of an expressway upon which a plurality of motion convertors have been installed coupled to a network of power generating devices.

In FIG. 1, there is shown a roadway 10 having a plurality of lanes 11, 12 and 13 in which are installed a plurality of motion converting means 14. The converting means 14 may be any one of a number of devices of a type capable of converting the linear motion of an object along a surface into rotational motion. The converting means 14 are each coupled to generating means 16 installed along the sides of roadway 10, each of the generators 16 being coupled together to provide a common electrical output.

Figure 2:
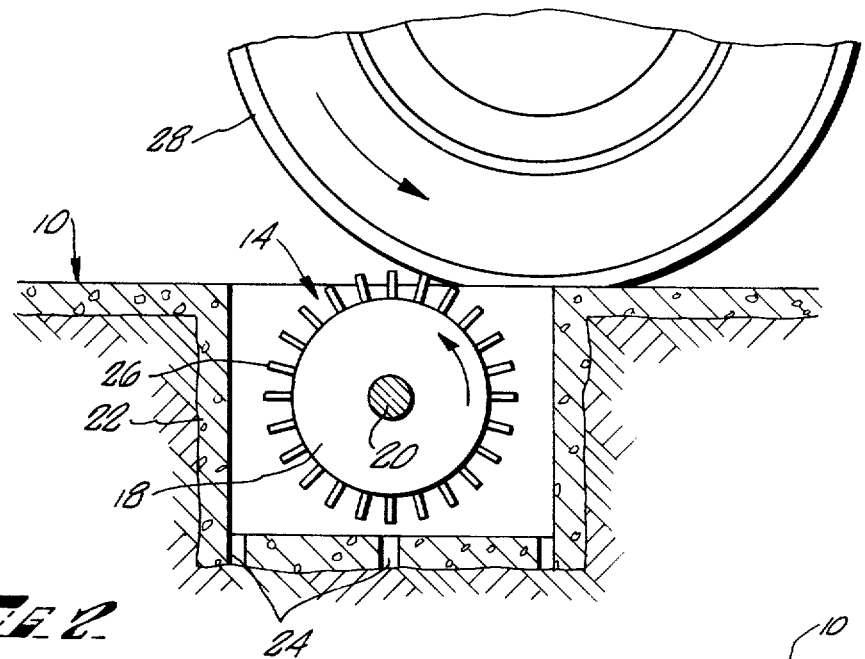
FIG. 2 is a sectional elevation of the expressway showing a roller installed therein and demonstrating the manner in which it is actuated by the tire of a vehicle passing thereover.

Referring to FIG. 2, there is shown an end view of one form of motion converting means 14 comprising a roller 18 mounted upon a cross shaft 20 suitably journaled in a housing 22 formed in the roadway. Housing 22 should be supplied with suitable drainage facilities such as apertures 24. The roller 18 is provided with a plurality of vanes 26 which are positioned so as to be engaged by a wheel 28 of a vehicle passing along the roadway. When the wheel 28 passes over the roller 18 striking the vanes 26, it will cause the roller 18 to turn in the direction of arrow 19, turning the shaft 20. Because of the relatively high speed at which the wheel strikes the vanes, the roller will move in the indicated direction and the rotative movement of the wheel will be of little effect. The shaft 20 is suitably coupled to a power generator 16 so that the rotation thereof will produce electrical power.

Figure 3:
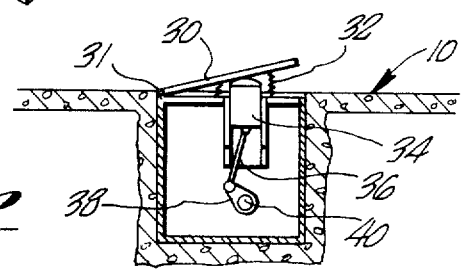
FIG. 3 is a diagrammatic elevation of a treadle type device utilized for the same purpose.

FIG. 3 discloses an alternate form of converting means 14 in the form of a treadle type device. Here, a treadly plate 30 is hingedly mounted at 31 to the roadway 10 and is supported at one end thereof by a spring means 32. The treadle plate 30 engages the upper surface of a piston 34 which is suitably coupled through piston rod 36 to a crankshaft 38 which is in turn coupled to a cross shaft 40. By coupling shaft 40 to power generating means 16, it will be apparent that the downward depression of treadle plate 30 caused by the forward motion thereover of a vehicle wheel will cause rotation of the crankshaft 38 thereby providing rotative motion to shaft 40 to drive the generators.

It will be apparent that there exists a number of means for coupling the driveshafts of the motion converting means 14 to the power generators 16 and likewise for coupling the outputs of the power generators 16 to provide a common electrical power outlet. The installation of the present invention on roads or expressways will provide a means for utilizing as a source of great deal of otherwise dissipated energy. Although the present system could function on upgrades or level stretches of highway or similar conveyances, the taxation of energy from such areas would not be advantageous as it would be at the expense of increased energy consumption on the part of the vehicles or other articles being conveyed. It is on downgrades where very little if any energy has to be added to the movement of the article where it presents the most advantageous taxable source of energy which may be utilized as a means of producing electrical power and which energy is otherwise presently being unused. All of such means are intended to be incorporated herein as a part of my invention and I conceive that there are other types of motion convertors which may be utilized herein without departing from my invention in its broader aspects. It is intended that my invention be limited by the lawful scope of the appended claims.

I claim:

1. An electric power generating system of a type adapted for use in conjunction with a motor vehicle expressway upon which there are from time to time a plurality of moving vehicles, the system comprising:

an expressway surface, motion converting means mounted beneath said expressway surface for converting the motion of the vehicles thereon into rotational motion, said converting means comprising one or more rollers mounted perpendicular to the direction of motion of said vehicles, friction means mounted upon said rollers, said friction means extending into the path of motion of said vehicles; and generator means coupled to said rollers for producing an electrical power outlet in response to rotational motion of said rollers.

* * * * *